United States Patent
Scheich

(10) Patent No.: US 10,126,634 B1
(45) Date of Patent: Nov. 13, 2018

(54) VARIABLE RADIUS CAMERA MOUNT

(71) Applicant: Davo Scheich, Troy, MI (US)

(72) Inventor: Davo Scheich, Troy, MI (US)

( * ) Notice: Subject to any disclaimer, the term of this patent is extended or adjusted under 35 U.S.C. 154(b) by 0 days.

(21) Appl. No.: 15/553,887

(22) PCT Filed: Mar. 30, 2016

(86) PCT No.: PCT/IB2016/000402
§ 371 (c)(1),
(2) Date: Aug. 25, 2017

(87) PCT Pub. No.: WO2016/147050
PCT Pub. Date: Sep. 22, 2016

Related U.S. Application Data

(60) Provisional application No. 62/134,909, filed on Mar. 18, 2015.

(51) Int. Cl.
| | |
|---|---|
| *G03B 17/56* | (2006.01) |
| *F16M 13/00* | (2006.01) |
| *F16M 11/08* | (2006.01) |
| *F16M 11/04* | (2006.01) |
| *F16M 11/12* | (2006.01) |
| *F16M 11/18* | (2006.01) |
| *F16M 11/10* | (2006.01) |

(52) U.S. Cl.
CPC ........... *G03B 17/561* (2013.01); *F16M 11/08* (2013.01); *F16M 13/00* (2013.01); *F16M 11/04* (2013.01); *F16M 11/10* (2013.01); *F16M 11/12* (2013.01); *F16M 11/18* (2013.01); *F16M 2200/024* (2013.01); *G03B 17/56* (2013.01)

(58) Field of Classification Search
CPC ...................................................... G03B 17/56
USPC ......................................................... 396/428
See application file for complete search history.

(56) References Cited

U.S. PATENT DOCUMENTS

| | | | | |
|---|---|---|---|---|
| 5,657,073 A | * | 8/1997 | Henley | G03B 37/04 348/38 |
| 6,141,034 A | * | 10/2000 | McCutchen | G02B 27/22 348/36 |
| 2010/0258694 A1 | * | 10/2010 | Steger | F16G 13/16 248/276.1 |

(Continued)

OTHER PUBLICATIONS

Variable Radius Camera Mount, International Search Report, PCT/IB2016/000402, dated Mar. 18, 2015, 2 pages.*

(Continued)

*Primary Examiner* — Clayton E Laballe
*Assistant Examiner* — Kevin Butler
(74) *Attorney, Agent, or Firm* — Avery N. Goldstein; Blue Filament Law, PLLC

(57) ABSTRACT

A camera array mount made with a series of links is provided that is easy to set up, dynamically reconfigurable, compact, and convenient to store and transport. The links are dynamically configurable into camera array mounts with adjustable radius of curvatures. The links are made of plastic, composites, metals, aluminum, or alloys that can be molded or cast for mass production. The links can be broken down for storage and transport. The links can be adapted for various camera sizes and camera mounts. The links provide improved indexing with angled slots that reduce pin slop. The links provide an optimized weight to support ratio.

20 Claims, 7 Drawing Sheets

(56) References Cited

U.S. PATENT DOCUMENTS

| | | | | |
|---|---|---|---|---|
| 2011/0249100 A1* | 10/2011 | Jayaram | ............... | H04N 5/2253 348/48 |
| 2013/0038991 A1* | 2/2013 | Fang | ..................... | F16M 13/02 361/679.01 |
| 2014/0153916 A1* | 6/2014 | Kintner | ................ | G03B 17/561 396/419 |
| 2014/0362176 A1* | 12/2014 | St. Clair | ............ | H04N 5/23238 348/36 |
| 2017/0353658 A1* | 12/2017 | Colin | ................ | H04N 5/23238 |

OTHER PUBLICATIONS

Variable Radius Camera Mount, Written Opinion International Search Report, PCT/IB2016/000402, dated Mar. 18, 2015, 3 pages.*

* cited by examiner (Detail A)

VARIABLE RADIUS CAMERA MOUNT

CROSS REFERENCE TO RELATED APPLICATIONS

This application claims priority benefit of U.S. Provisional Application Ser. No. 62/134,909 filed 18 Mar. 2015; the contents of which are hereby incorporated by reference.

FIELD OF THE INVENTION

The present invention generally relates to the field of photography, and more specifically to a new and useful device for constructing dynamic camera arrays.

BACKGROUND OF THE INVENTION

A camera array is a formation of multiple cameras that are networked to a controller to capture an image simultaneously or in a synchronized order from each individual camera perspective or angle. When the images or captured frames are edited together many types of photographic and video effects may be obtained. For example, when the cameras in an array are triggered simultaneously and the captured frame images are edited together a moment in time appears frozen as a viewer is moved around the composite image. In addition to the frozen moment additional special effects include stop-start, slow motion, time ramp, among other popular special effects.

While the aforementioned special effects have become more popular in video and movie production, the traditional set up for obtaining these special effects are complex and cumbersome, such as camera arrays mounted to fixed radius bent pipe or a fixed truss. FIGS. 1A and 1B illustrate an existing metal or aluminum frame or truss structure 10 formed with a fixed radius for supporting the cameras 12 of the array. The fixed radius bent pipe or truss configuration requires a film or production director to commit to an exact shape to be rigged or set up several days before the shoot, and thus limits the ability of a film crew to make real-time adjustments in their set up as changes in a film shoot may dictate. Furthermore, the traditional array support structure is hard to transport, especially to remote locations.

Thus there exists a need for camera array mounts that are easy to set up, dynamically reconfigurable, compact, and convenient to store and transport.

SUMMARY OF THE INVENTION

A camera array mount includes a plurality of links, each of the plurality of links having a stadium shape with a first joinder point at a first radius and a second joinder point at a second radius, and at least one hole adapted for mounting a camera, and a joinder simultaneously engaging the first joinder point of one of the plurality of links and a second joinder point of another of the plurality of links.

A camera array mount includes a plurality of links, each of the plurality of links having a stadium shape with a first joinder point at a first radius and a second joinder point at a second radius, and at least one hole adapted for mounting a camera. The links have a plurality of set holes configured in lines as a series of radiating spokes on the first joinder point, and a plurality of wedges arrayed in a circular pattern on the second joinder point, where the plurality of set holes are configured to overlay the plurality of wedges. A set pin is adapted to be inserted through a set hole from the plurality of set holes and to engage a wedge from the plurality of wedges to determine a degree of angular position between a first link and a second link from the plurality of links.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE INVENTION

The present invention has utility as camera array mounts that are easy to set up, dynamically reconfigurable, compact, and convenient to store and transport. The following description of various embodiments of the invention is not intended to limit the invention to these specific embodiments, but rather to enable any person skilled in the art to make and use this invention through exemplary aspects thereof.

It is to be understood that in instances where a range of values are provided that the range is intended to encompass not only the end point values of the range but also intermediate values of the range as explicitly being included within the range and varying by the last significant figure of the range. By way of example, a recited range from 1 to 4 is intended to include 1-2, 1-3, 2-4, 3-4, and 1-4.

Embodiments of the inventive links are dynamically configurable into camera array mounts with adjustable radius of curvatures. The inventive links may be made of plastic, composites, metals, aluminum, or alloys that may be molded or cast for mass production. The links may be broken down for storage and transport. The links may be adapted for various camera sizes and camera mounts. Embodiments of the inventive links provide improved indexing with angled slots that reduce pin slop. Embodiments of the inventive links provide an optimized weight to support ratio. The inventive links may be configured with a self-curving system where opposing cables act to draw the geared links one way or the other.

By resorting to an inventive link with a stadium shape extended rotation around each of the opposing radii is achieved with a central area that allows for the extension of link length, mounting of equipment, or both. A stadium shape is a two dimensional projection of a capsule. The stadium shaped link having opposing planar top and bottom surfaces facilitates storage, equipment mounting, and joinder of links to form a configurable camera rail. The area of a stadium shaped link is well known as being $\pi r^2 + 2*r*a$, where r is the radius of each end semicircle and a is the rectangular central region area. It is appreciated that an inventive stadium shaped link is readily formed with different radii on the opposed ends.

Embodiments of the inventive links may be configured with embedded electronics including electrical and data connections for camera controls, processing, and data handling. For example, electronic slip rings may be used in embodiments where the links attach to each other and would act to connect all the components down the line (links become shape, support and communication between cameras). The mountable cameras would be attached to the links with short power, trigger, and data cables, where power networking and trigger signals would be passed down the links through the slip rings, or a jumper cable if needed.

Figure 1A:
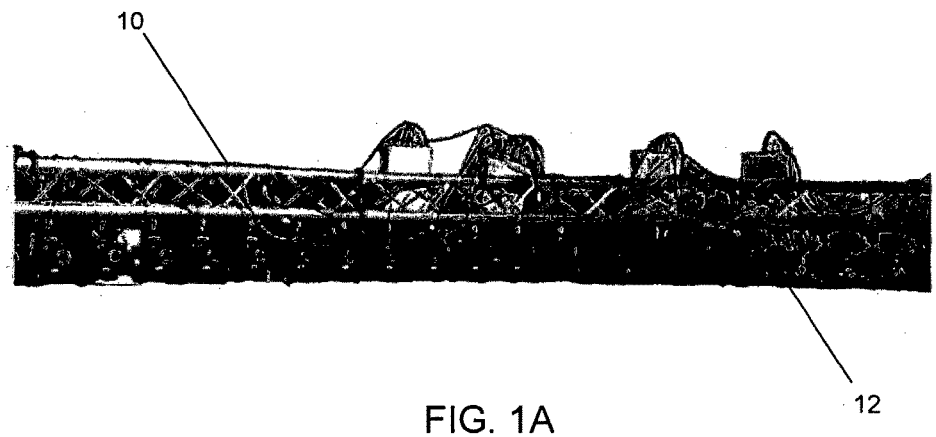
FIGS. 1A and 1B are prior art photographic views of a traditional bent pipe or a truss for supporting a camera array.
Figure 1B:
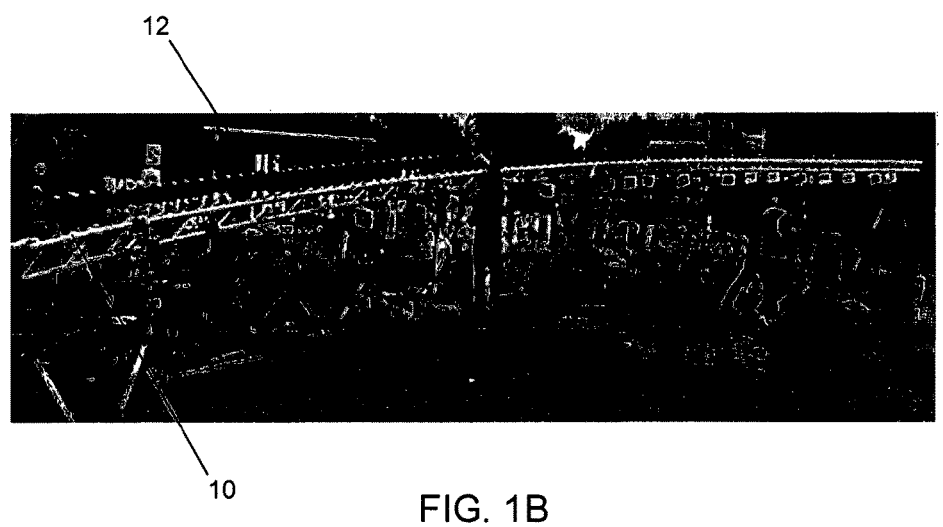
Figure 2A:
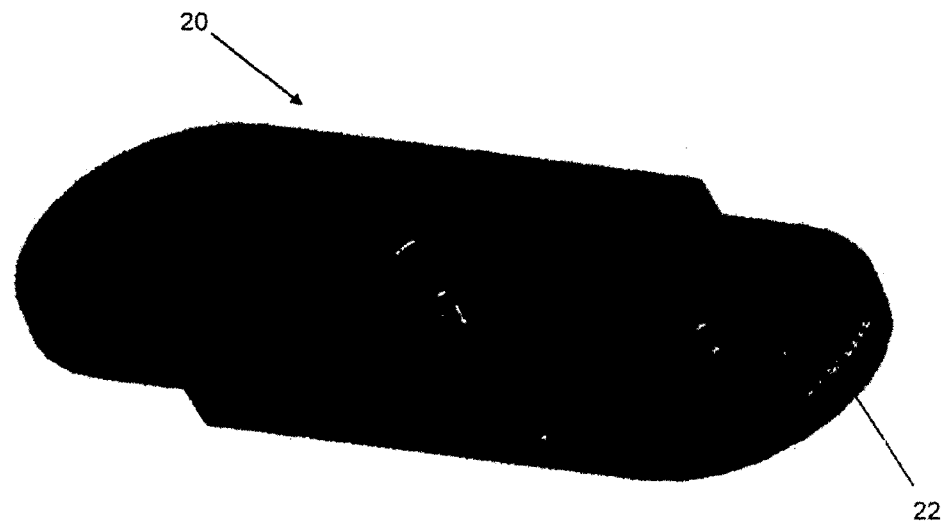
FIGS. 2A and 2B are perspective views of a link with seven teeth and five teeth, respectively in accordance with embodiments of the invention.
Figure 2B:
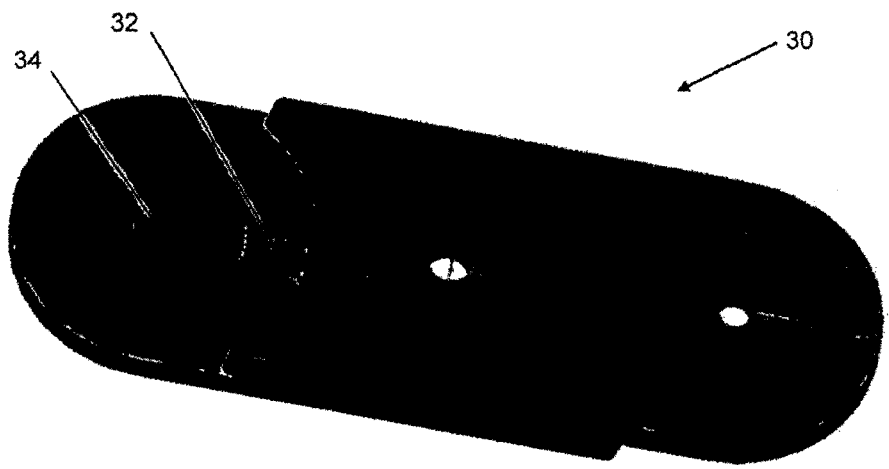
Figure 3A:
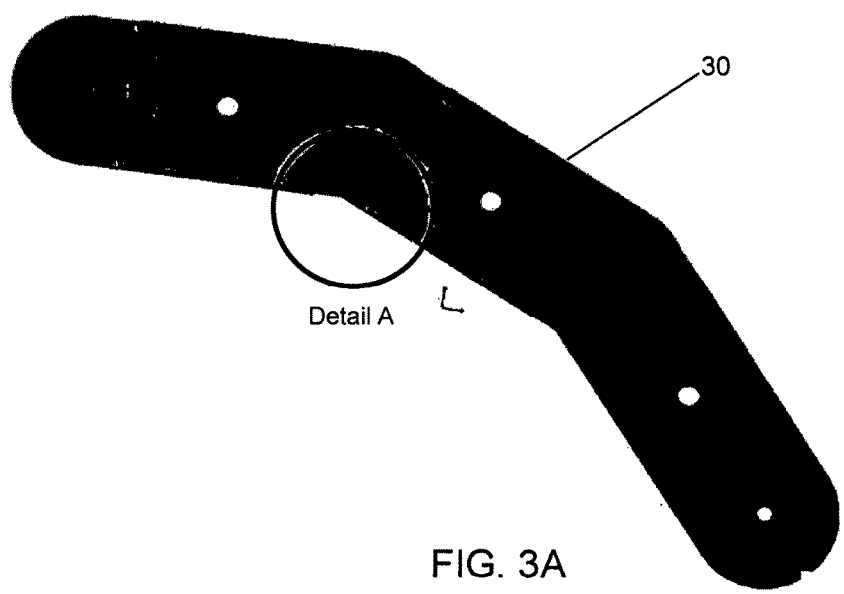
FIG. 3A is a top perspective view of the links of FIG. 2B with a twenty five degree rotation in accordance with embodiments of the invention.
Figure 3B:
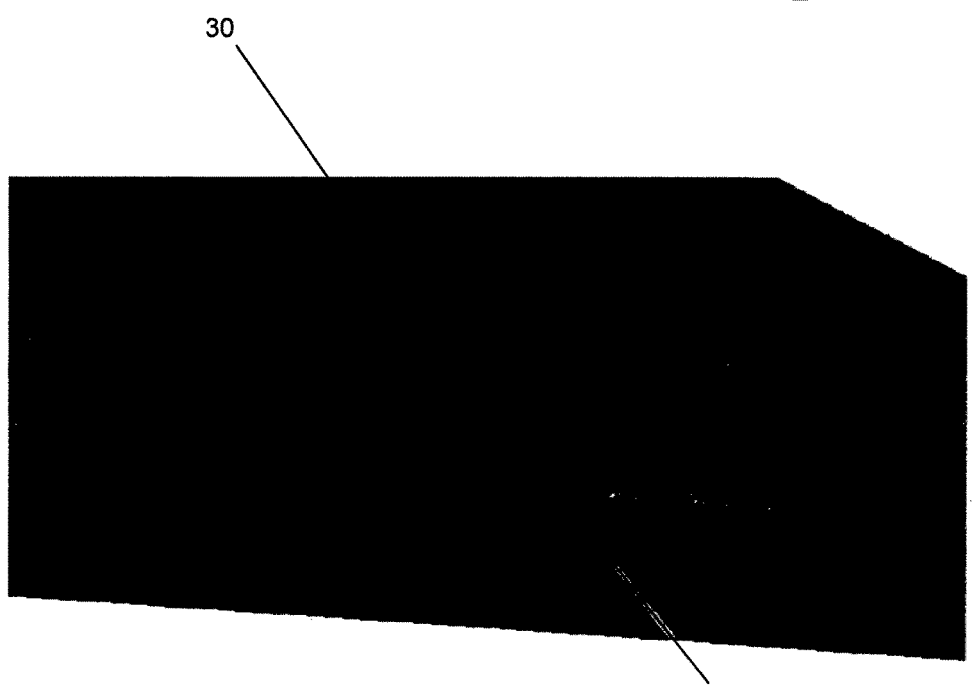
FIG. 3B is a detail view of FIG. 3A showing the tooth engagement at the maximum twenty five degree rotation in accordance with an embodiment of the invention.
Figure 4A:
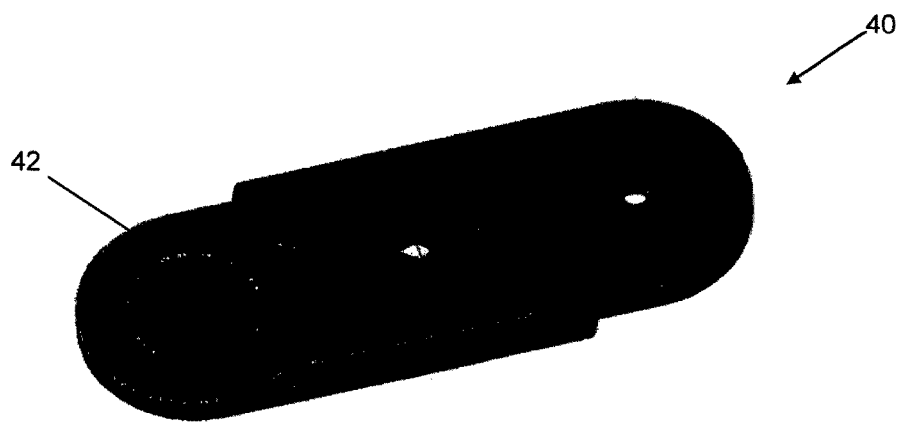
FIG. 4A is a perspective view of a link with a full circle of teeth in accordance with embodiments of the invention.
Figure 4B:
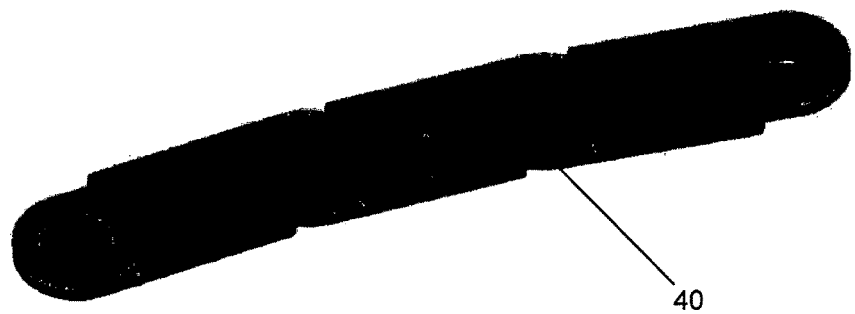
FIG. 4B is a top perspective view of the link of FIG. 4A joined with identical links for supporting a set of cameras in accordance with embodiments of the invention.
Figure 4C:
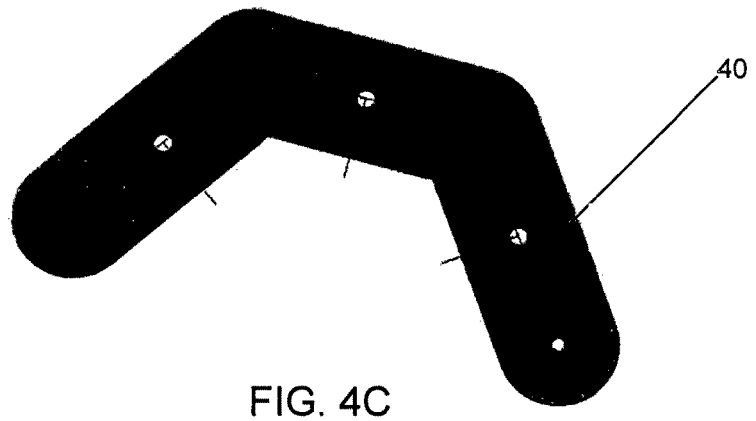
FIG. 4C is a top perspective view of the links of FIG. 4B in a bent configuration in accordance with an embodiment of the invention.
Figure 5:
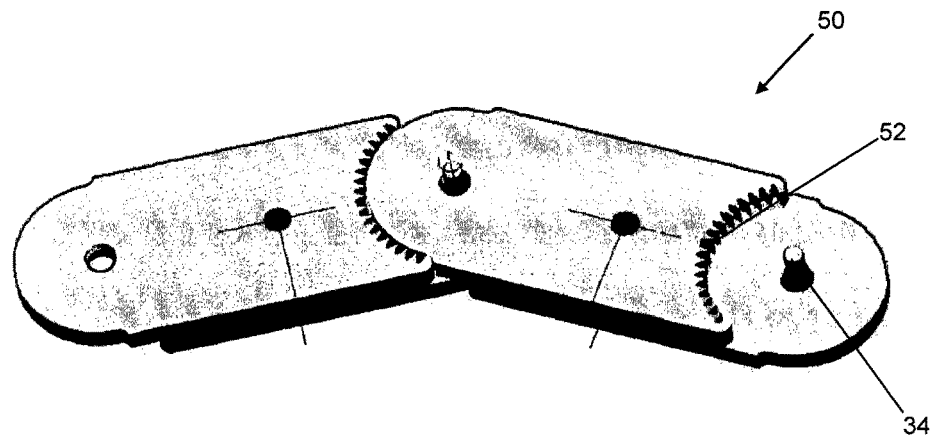
FIG. 5 is a perspective view of a saw tooth link design in accordance with an embodiment of the invention.

Referring now to the figures, FIG. 2A illustrates an inventive link 20 with seven teeth 22 for locking in an adjustment position, while FIG. 2B shows a link 30 with five teeth 32. A circular recess provides for edge meshing between joined links 30. Clearly visible in FIG. 2B is a pivot post 34 that the attached links rotate on. FIG. 3A is a top perspective view of the links 30 of FIG. 2B with a twenty five degree rotation in accordance with embodiments of the invention. FIG. 3B is a detail view of FIG. 3A showing the tooth 32 engagement at the maximum twenty five degree rotation in accordance with an embodiment of the invention. FIG. 4A is a perspective view of a link 40 with a full circle of teeth 42 that allow for a greater range of rotation. FIG. 4B is a top perspective view of the link 40 of FIG. 4A joined with similar links 40 for supporting a set of cameras in accordance with embodiments of the invention. FIG. 4C is a top perspective view of the links of FIG. 4B in a bent configuration in accordance with an embodiment of the invention. FIG. 5 is a perspective view of link 50 with a saw tooth 52 geared design for locking in a desired angle.

Figure 6:
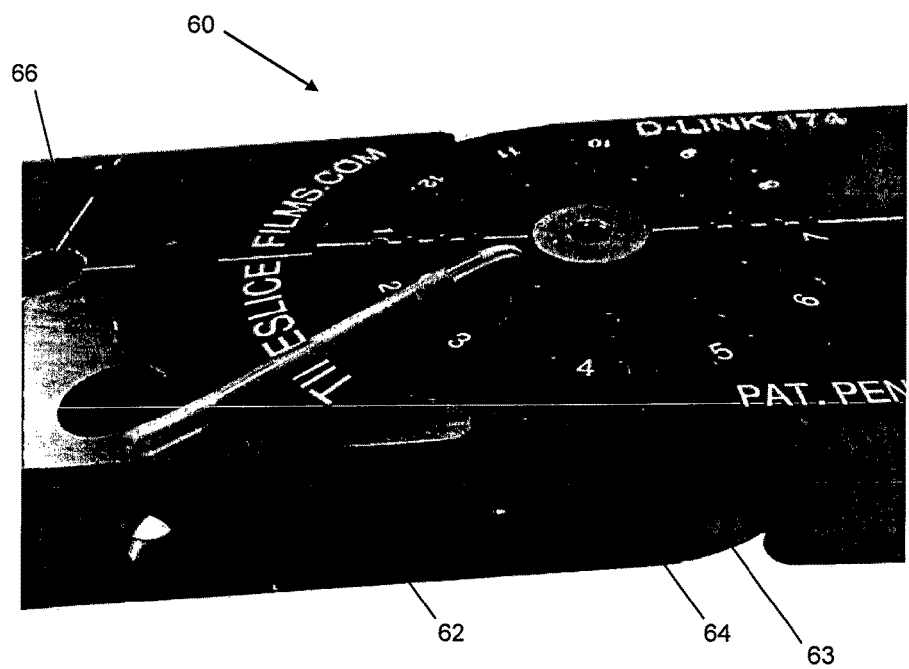
FIG. 6 is a perspective photographic view of a set of joined links in accordance with an embodiment of the invention.

FIG. 6 is a perspective photographic view of a set of joined links 60 in accordance with an embodiment of the invention. The links 60 adjust to any radius with an index or set pin 62 inserted in one of a set of adjustment set holes 64. In a specific embodiment the links 60 index in 0.25 m increments when bent outward, and in 0.125 increments when bent inward. Indicia 63 are provided to denote angular position between contiguous links in certain embodiments. Embodiments of the links 60 have been made to accommodate adding different sized cameras within the same set. In a specific embodiment a high speed camera may be placed on the end of the camera array and adjusted on three axes for proper alignment with the array. Embodiments of the links 60 have many mounting holes 66 for mounting a range of positions and accessories. Accessories may include flags to block lens flare, black drapes to cover the stands that support the links 60 and provide a clean look to the setup. The links 60 are also configured to accommodate threaded rods to be inserted to build multi-dimensional rigs (two or more tiers) of camera arrays. The links 60 allow for additional links to be attached in a perpendicular manner, which allows for additional links to be used as vertical supports to hold up the entire camera rig. In addition, the variable radius allows these vertical supports of "feet" to come out at any angle and finish level with the floor or ground.

Figure 7:
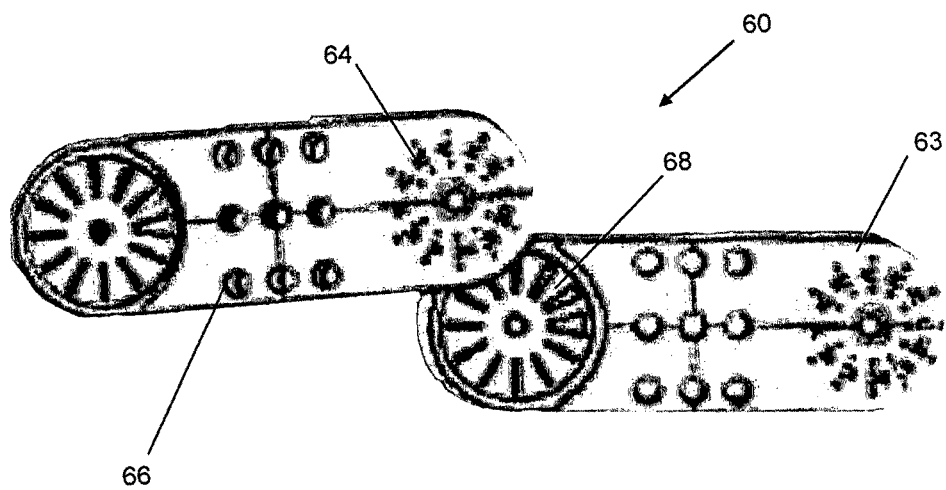
FIG. 7 is a perspective view of the set of links as shown in FIG. 6 prior to attachment showing how index pin engage either side of a progressively tighter groves in accordance with an embodiment of the invention.

FIG. 7 is a perspective view of the set of links 60 as shown in FIG. 6 prior to attachment showing how index pin or set pin 62 engage either side of a progressively tighter groves 68 in accordance with an embodiment of the invention. The groove shape 68 is such that the groove 68 exactly creates the desired radius when an index pin 62 is placed into a corresponding hole 64. The link is bent until the pin stops against the side of the groove 68. For example when an indexing pin 62 is place through a hole 64 that drops into a slot or groove 68 below the hole 64, and the pin 62 is bent in one direction a first radius is realized, while if the pin 62 is bent in an opposing direction the radius is increased. In a specific inventive embodiment, the positioning and bending of the pin 62 provides a 0.125 increase or change to the radius. For example, with pin 62 in Pin position 4=4 meter radius in one direction–4.125 in the other direction, and if the pin 62 is placed in Pin position 4.25=4.25 meter radius in one direction–4.37 in the other direction.

Figure 8:
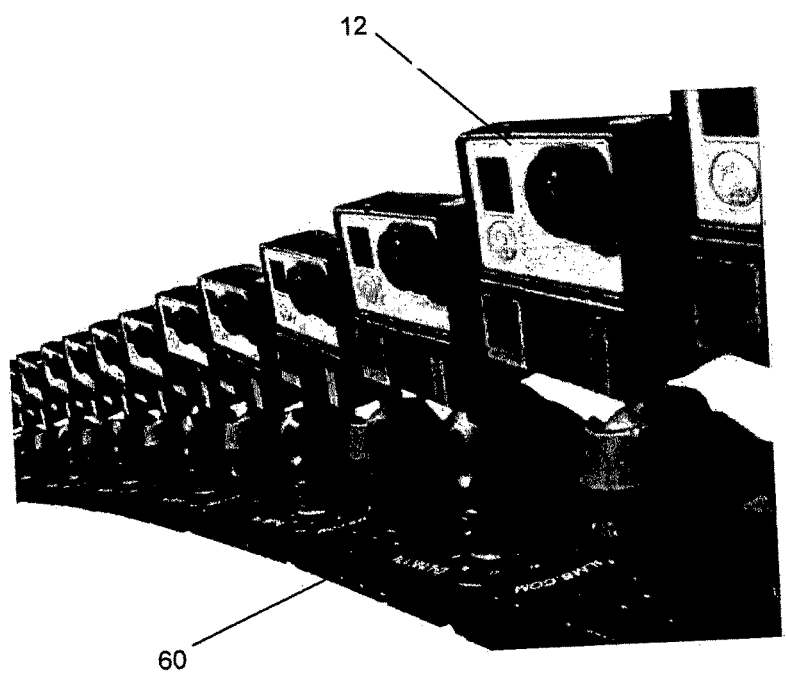
FIG. 8 is a perspective view of a camera array supported on a series of links in accordance with an embodiment of the invention.
Figure 9:
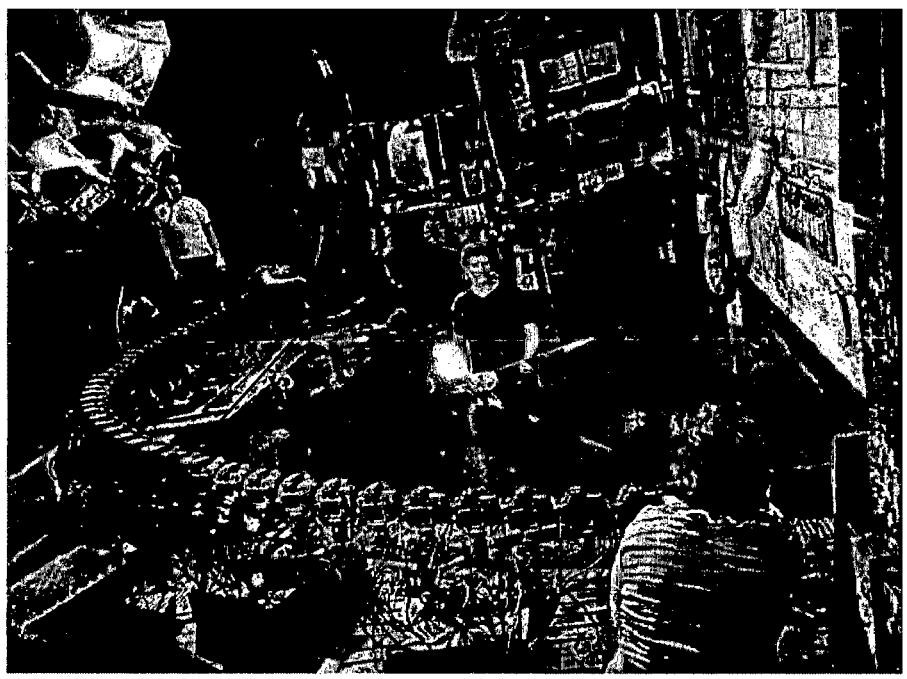
FIG. 9 is a photograph of a production set configured with a dynamically configurable camera array supported with linkages in accordance with an embodiment of the invention.

FIG. 8 is a perspective view of a camera array 12 supported on a series of links 60 in accordance with embodiments of the invention. FIG. 9 is a photograph of a production set configured with a dynamically configurable camera array supported with linkages in accordance with an embodiment of the invention. As shown in FIG. 9, a progressive curve is depicted where a straight line begins to bend around in an indexed progressively tighter curve. In the production set shown in FIG. 9, the shape of the array mount is configured on the production set itself, and not in advance as was the case with traditional bent pipe or a truss.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A camera array mount comprising:
a plurality of links, each of said plurality of links having a stadium shape with a first joinder point at a first radius and a second joinder point at a second radius, and at least one hole adapted for mounting a camera; and
a joinder simultaneously engaging the first joinder point of one of said plurality of links and a second joinder point of another of said plurality of links.

2. The camera array mount of claim 1 wherein each of said plurality of links has a circular recess around at least one of the first radius or the second radius.

3. The camera array mount of claim 2 further comprising a plurality of saw teeth on the circular recess surface around at least one of the first radius or the second radius.

4. The camera array mount of claim 1 wherein each of said plurality of links further comprises a plurality of teeth on a surface around at least one of the first radius or the second radius.

5. The camera array mount of claim 1 wherein each of said plurality of links has opposing planar surfaces.

6. The camera array mount of claim 1 wherein the at least one hole extends parallel to the first joinder point.

7. The camera array mount of claim 1 wherein the at least one hole extends orthogonal to the first joinder point.

8. The camera array mount of claim 1 wherein the at least one hole extends parallel to the first joinder point.

9. The camera array mount of claim 1 further comprising an angular marking indicia.

10. The camera array mount of claim 1 wherein each of said plurality of links is made of at least one of plastic, composites, metals, aluminum, or alloys that may be molded or cast for mass production.

11. The camera array mount of claim 10 wherein the magnitude of the degree of angular position between said first link and said second link is changed by bending said inserted set pin in said wedge.

12. A camera array mount comprising:
a plurality of links, each of said plurality of links having a stadium shape with a first joinder point at a first radius and a second joinder point at a second radius, and at least one hole adapted for mounting a camera;
a plurality of set holes configured in lines as a series of radiating spokes on said first joinder point;
a plurality of wedges arrayed in a circular pattern on said second joinder point, where said plurality of set holes are configured to overlay said plurality of wedges; and
a set pin adapted to be inserted through a set hole from said plurality of set holes and to engage a wedge from said plurality of wedges to determine a degree of angular position between a first link and a second link from said plurality of links.

13. The camera array mount of claim 12 wherein each of said plurality of links has a circular recess around at least one of the first radius or the second radius.

14. The camera array mount of claim 12 wherein each of said plurality of links has opposing planar surfaces.

15. The camera array mount of claim 12 wherein the at least one hole extends parallel to the first joinder point.

16. The camera array mount of claim 12 wherein the at least one hole extends orthogonal to the first joinder point.

17. The camera array mount of claim 12 wherein the at least one hole extends parallel to the first joinder point.

18. The camera array mount of claim 12 further comprising an angular marking indicia.

19. The camera array mount of claim 12 wherein each of said plurality of links is made of at least one of plastic, composites, metals, aluminum, or alloys that may be molded or cast for mass production.

20. The camera array mount of claim 12 wherein each of said plurality of links further comprise mounting holes for mounting a range of positions and accessories.

* * * * *